June 17, 1924.
A. B. BROLUSKA
1,497,668
ELECTRICAL MACHINE
Filed March 16, 1922
6 Sheets-Sheet 1
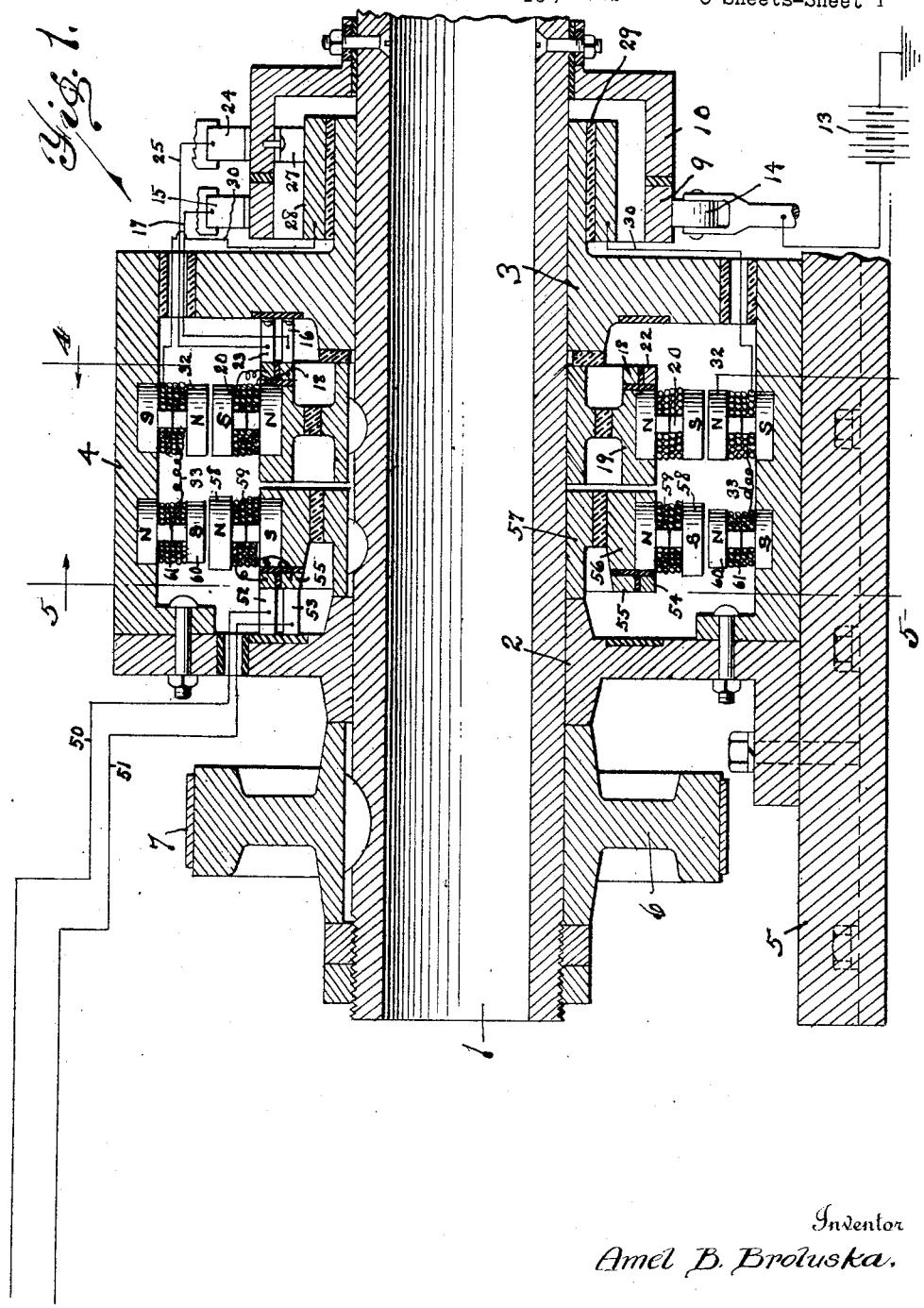
Inventor
Amel B. Broluska.
By Edward N. Pagelsen
Attorney June 17, 1924.  1,497,668

A. B. BROLUSKA

ELECTRICAL MACHINE

Filed March 16, 1922     6 Sheets-Sheet 2

Inventor
Amel B. Broluska

By Edward N. Pagelsen
Attorney

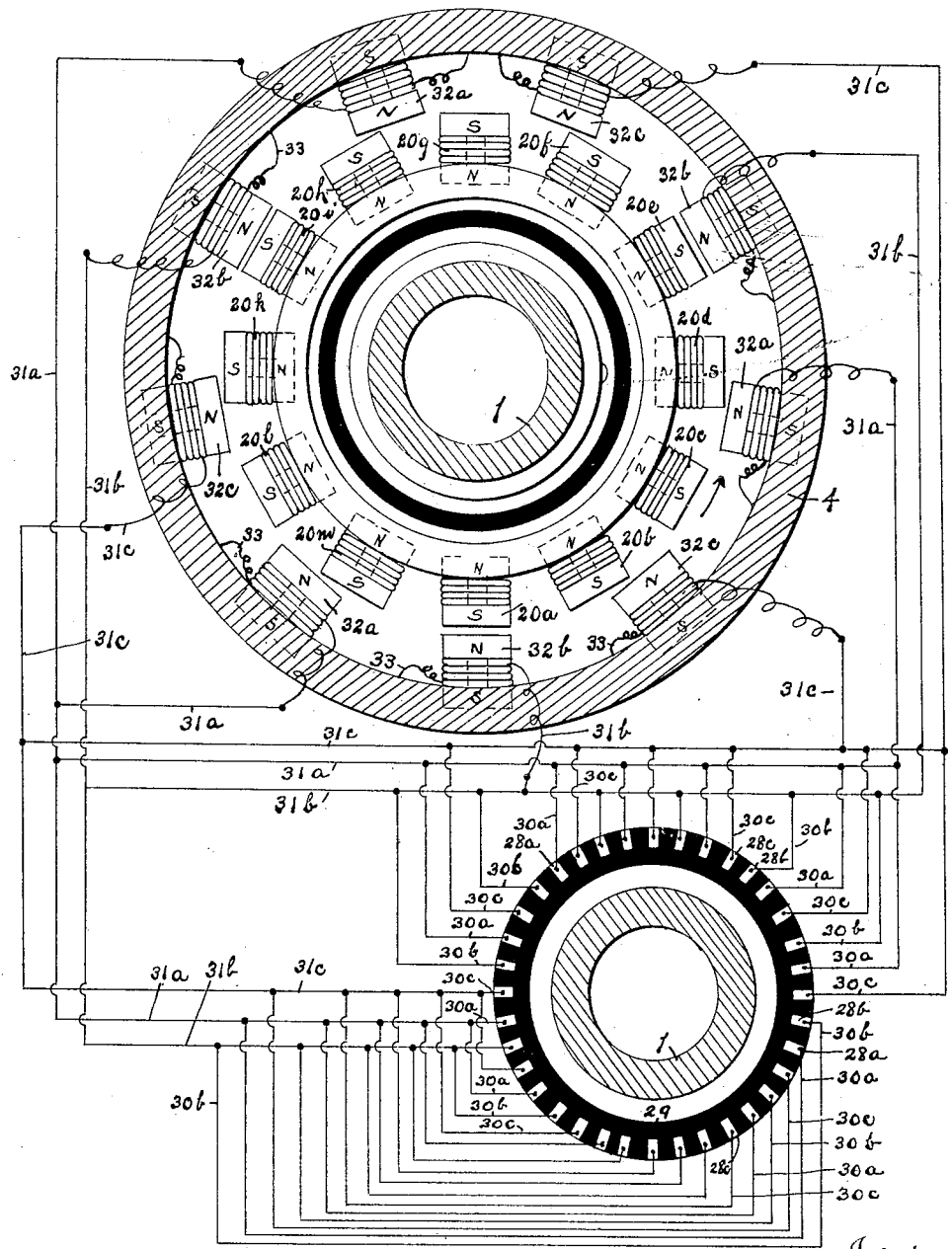

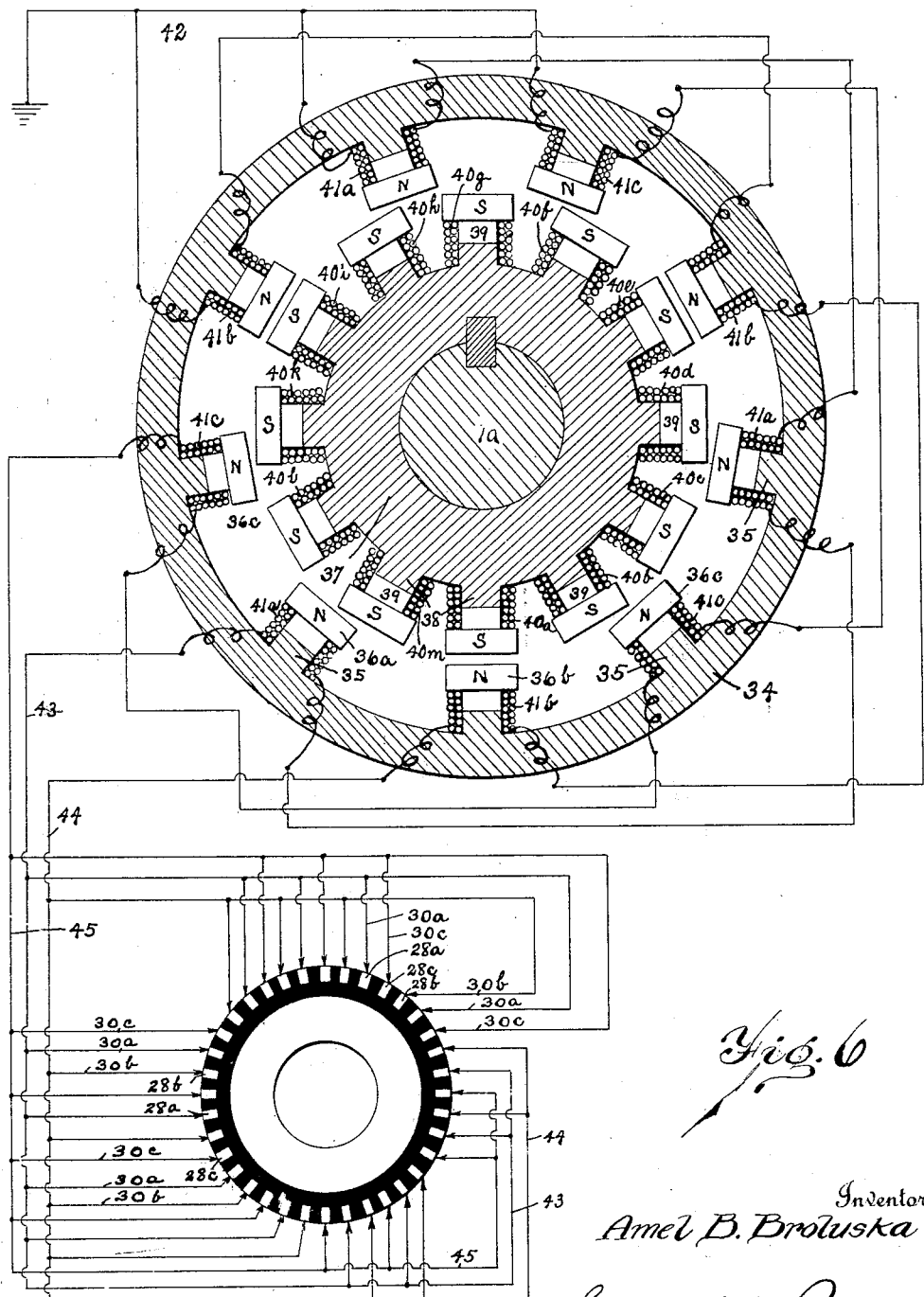

June 17, 1924.

A. B. BROLUSKA 1,497,668

ELECTRICAL MACHINE

Filed March 16, 1922     6 Sheets—Sheet 6

Inventor
Amel B. Broluska

By Edward N. Pagelsen
Attorney

Patented June 17, 1924.

1,497,668

UNITED STATES PATENT OFFICE.

AMEL B. BROLUSKA, OF DETROIT, MICHIGAN.

ELECTRICAL MACHINE.

Application filed March 16, 1922. Serial No. 544,068.

*To all whom it may concern:*

Be it known that I, AMEL B. BROLUSKA, a citizen of the United States, and residing at Detroit, in the county of Wayne and State of Michigan, have invented a new and Improved Electrical Machine, of which the following is a specification.

This invention relates to the construction of electric machines, both generators and motors, and its object is to provide a machine of this character which will have a high output in either power or current, which can be easily constructed, and which can be readily repaired when damaged.

Figure 5:
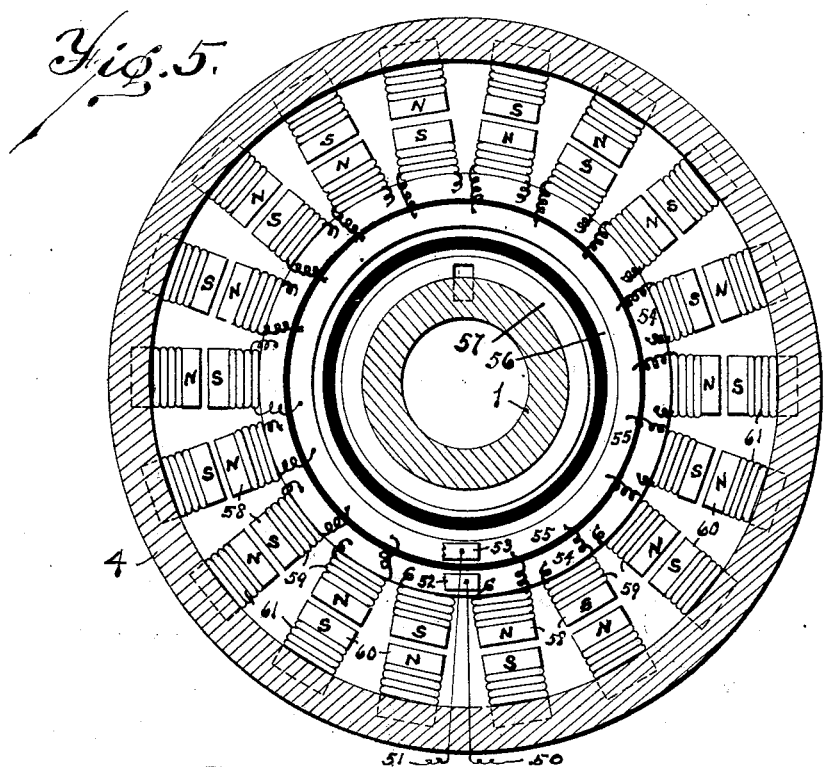
Figure 2:
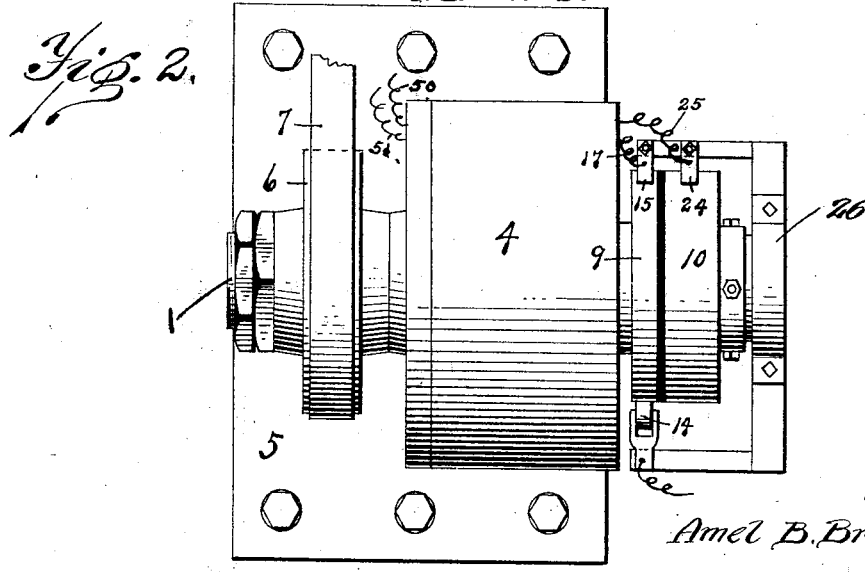
Figure 3:
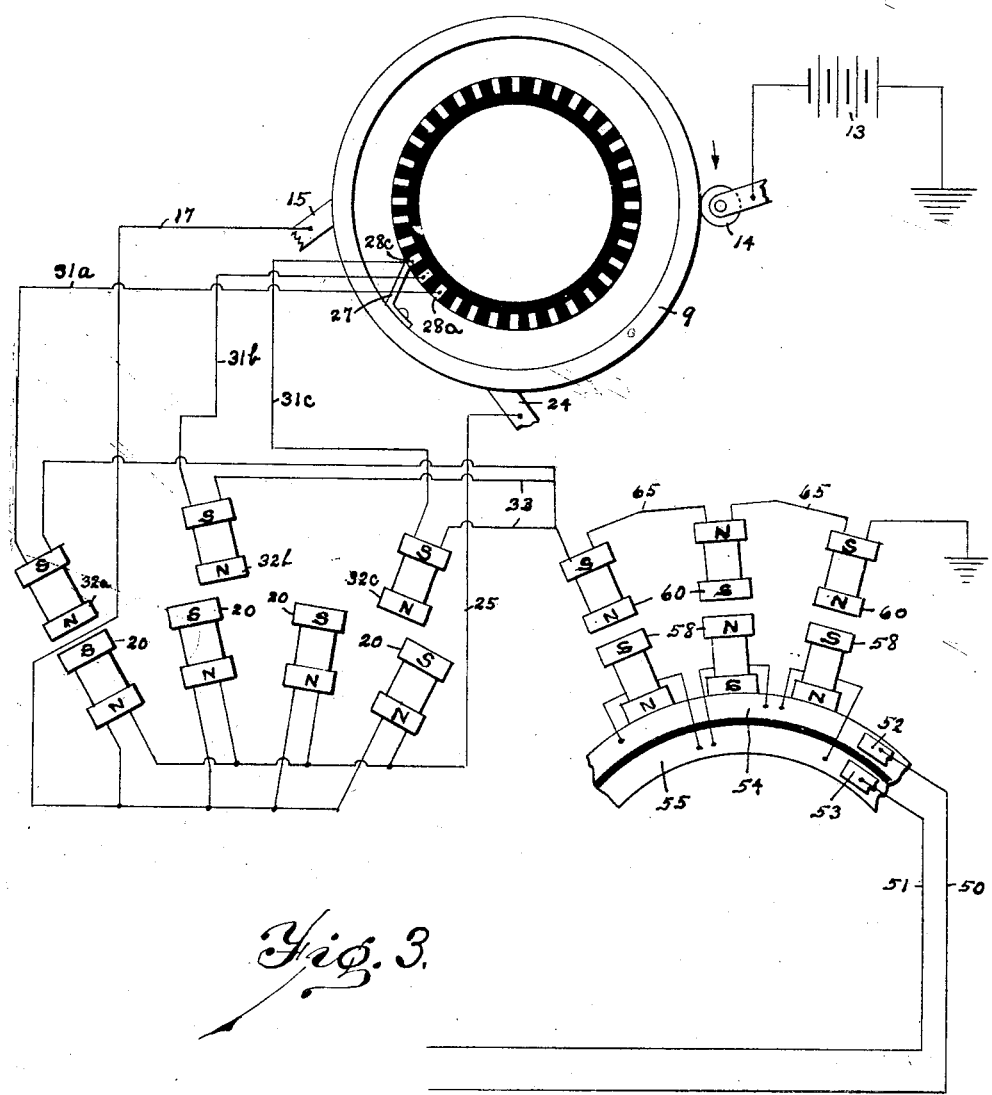
Figure 7:
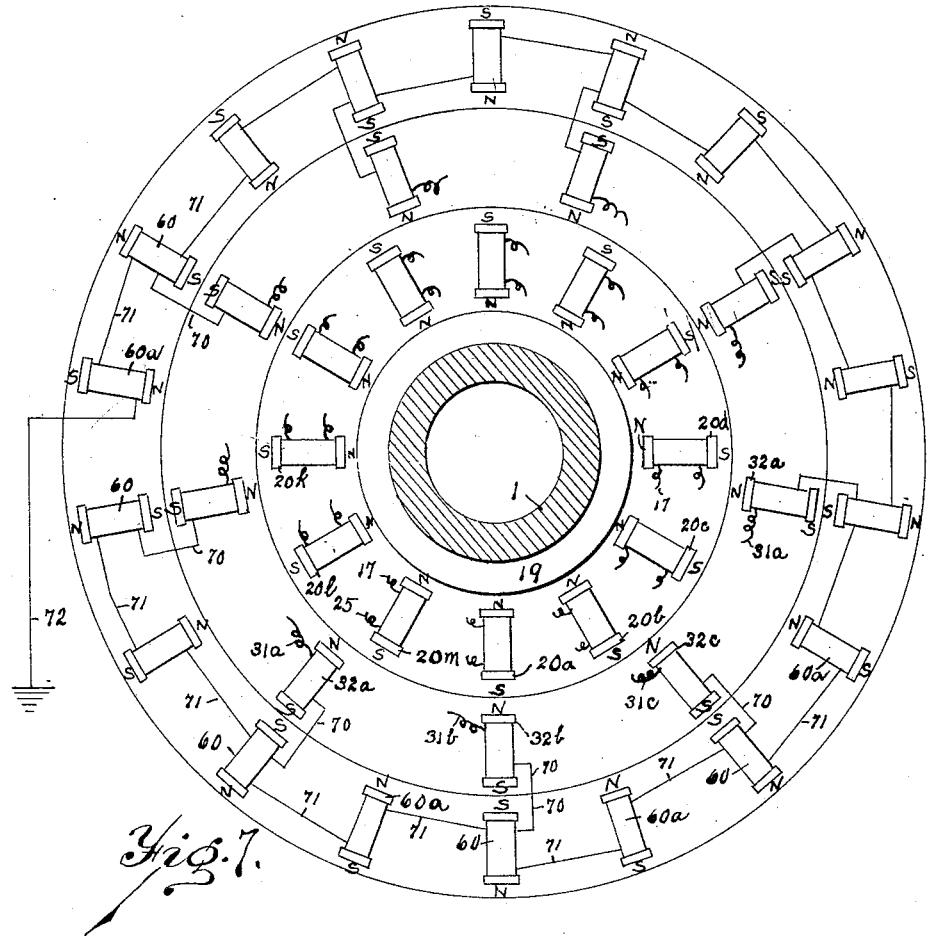

In the accompanying drawings, Fig. 1 is a central longitudinal section of this improved electric machine. Fig. 2 is a plan thereof on a smaller scale. Fig. 3 is a diagram showing the connections between the field magnets of a motor and a generator. Figs. 4 and 5 are sections on the lines 4—4 and 5—5 of Fig. 1. Fig. 6 is a section similar to Fig. 4 of a motor of similar construction having the field magnets in groups and the windings of each group connected in series. Fig. 7 is a diagram showing another system of wiring between the field magnets of the motor and the generator.

Similar reference characters refer to like parts throughout the several views.

As shown in Fig. 1, a shaft 1 is mounted in the bearings 2 and 3, the bearing 3 being in the end of a cup-shaped casting which includes a cylindrical housing 4 which is bolted to the base plate 5 that supports the bearing 2. The several parts are shown conventionally as none of the details shown embody invention in themselves and it will be understood that any desired type of brushes, commutator, connectors, magnets or windings may be employed instead of those shown.

Attached to the shaft 1 is a pulley 6 which may receive the belt 7 shown in Fig. 2. Also attached to the shaft is a cup-shaped contact ring formed of two parts 9 and 10, the former attached to but carried by the latter and the latter attached to but insulated from the shaft. A source of electric energy 13 connects to a contact 14, preferably a roller, which bears on the ring 9. A second contact 15 engages this ring 9 and connects to a brush 16 by means of a wire 17 and this brush 16 engages the contact ring 18 on a spool 19 which is attached to but insulated from the shaft 1. Mounted on this spool are a series of electro-magnets 20, all similarly wound so that their outer ends are of the same polarity. One end of the winding of each armature magnet 20 connects to the ring 18 while the other connects to a similar ring 22, also mounted on the spool 19. A brush 23 engages this ring 22 and connects to the brush 24 by means of a wire 25. As shown in Fig. 2, the shaft 1 may have an end bearing 26.

Mounted on the inner side of the ring 10 is a brush 27 which engages a commutator consisting of bars $28^a$, $28^b$ and $28^c$ mounted in the insulating sleeve 29. Wires $30^a$, $30^b$ and $30^c$ connect the several bars $28^a$, $28^b$ and $28^c$ to the main wires $31^a$, $31^b$ and $31^c$ respectively, and these main wires connect to the field magnets $32^a$, $32^b$ and $32^c$, respectively, as indicated in Fig. 4.

Mounted within the stationary shell or housing 4 are a series of field magnets in groups of three, all magnets $32^a$ being connected by the wires $31^a$ to the commutator bars $30^a$, and similarly, the magnets $32^b$ and $32^c$ are connected to the commutator bars $30^b$ and $30^c$ respectively. The number of commutator bars should always be divisible by the number of the field magnets 32 and by the number of the armature magnets 20.

The armature is supposed to rotate in the direction of the arrow in Fig. 4. Current is being received by the field magnets $32^c$ which pull on the armature magnets $20^b$, $20^f$ and $20^k$ during the time the armature rotates about five degrees, which is the time the brush 27 contacts with one of the commutator bars $28^c$. The brush 27 next makes contact with a commutator bar $28^a$ which causes the field magnets $32^a$ to become energized and attract the armature magnets $20^e$, $20^g$ and $20^i$ during the next five degrees of rotation of the shaft. In this manner the shaft is constantly rotated, the energization of the armature magnets 20 remaining constant and of the field magnets 32 being intermittent but not reversed. The armature magnets 20 may therefore be of carbon steel for there is no objection to their becoming permanent magnets. The efficiency of this motor is high as there is no heat generated by frequent reversal of current and the pull of the magnets is practically tangential at all times. Any desired means may be employed to complete the circuit of the field magnet windings, wires 33 being shown grounded on the housing 4 in Fig. 4. In Figs. 1 and 3, however, I have shown the wires 33 leading to the field magnets of an alternating current generator within the same housing as this motor.

The construction shown in Fig. 6 is the same as that just described, having bars 28$^a$, 28$^b$ and 28$^c$ to which the wires 30$^a$, 30$^b$ and 30$^c$ connect. The housing 34 has radial projections 35 to which the core members 36$^a$, 36$^b$ and 36$^c$ of the field magnets are attached. The armature 37 is attached to a shaft 1$^a$ and has radial projections 38 to which the core pieces 39 are attached. The windings 40$^a$ to 40$^m$ inclusive of the armature magnets connect to rings similar to the rings 18 and 22 and in the manner shown in Fig. 1. The windings 41$^a$, 41$^b$ and 41$^c$ of the field magnets 36$^a$, 36$^b$ and 36$^c$ respectively are connected in series and all are grounded by the wire 42. The several wires 30$^a$ all lead to the wire 43 and one winding 41$^a$, the wires 30$^b$ all lead to the wire 44 and to one winding 41$^b$, while the wires 30$^c$ all lead to the wire 45 and to one winding 41$^c$. The other windings of the field magnets are connected in series as above explained and shown in Fig. 6. The operation of the motor when the field magnets art thus connected is substantially the same as when the field magnets are connected in parallel as shown in Fig. 4. In each of these cases the power developed may be transmitted by the belt 7.

Instead of using the power developed for mechanical purposes, it may be used to produce an alternating current which may be conducted by the wires 50 and 51 (Fig. 1) which connect to the brushes 52 and 53 respectively which engage the contact rings 54 and 55 on the rotor 56 which is mounted on but insulated from the sleeve 57 secured to the shaft 1.

On the rotor 56 are mounted the armature magnets 58 whose windings 59 connect to the rings 54 and 55 so that the current in these rings will be the same as that in the windings 59 of these radial magnets. Mounted in the housing 4 are a series of field magnets having cores 60 and windings 61 which are connected to the wires 33 which lead from the windings of the field magnets 32 of the motor just described. Adjacent windings 61 are in opposite directions so that the inner ends of adjacent cores 60 have opposite polarities.

Referring to Fig. 5, it will be noted that closed paths of magnetic flux are presented when the magnets are in alinement and that these paths are broken and a flux in each armature magnet in the opposite direction established by the movement of this magnet from alinement with one field magnet to a similar relation to the next adjacent field magnet. The result is an alternating electric current in the wires 50—51.

There may be more or less field magnets 60 for the generator than field magnets 32 for the motor. One manner of connecting these magnets is shown in Fig. 3 where the windings of the armature magnets 20 of the motor are shown connected to the brushes 15 and 24, the wires 31 connected to the field magnets 32 and the commutator bars 28, and the wires 33 lead from the field magnets 32 of the motor to a group of field magnets 60 of the generator. These magnets 60 are connected by the wires 65 and are grounded. The number of magnets 60 in the group will depend upon the number of magnets 60 in the generator and the number of groups of field magnets in the motor. As these magnets 60 never change polarity, they may be made of steel to retain magnetism during the time the current to the magnets 32 is broken so that the magnetic flux in the field magnets 60 is practically uninterrupted.

Fig. 7 shows another system of wiring between the windings of the field magnets 32 of the motor and the windings of the field magnets 60 of the generator. There are preferably twice the number of magnets 60 as magnets 32 and each magnet 32 is adjacent a magnet 60 and connects thereto by a wire 70. The windings of the intermediate magnets 60$^a$ are connected to the windings of the two next adjacent magnets 60 by wires 71. One of the magnets 60 does not connect to the magnet 60$^a$ at one side and the winding of this particular magnet 60$^a$ is grounded. All the magnets 60 and 60$^a$ are therefore in series and the magnets 32 are in parallel connected to different parts of the series. Instead of all the magnets 60 and 60$^a$ being in one group, they may be in a number of groups, one being as shown in Fig. 3, but with the connections between them and the magnets 32 as shown in Fig. 7. As many grounded wires 72 may be used as desired.

The details, proportions, location and numbers of magnets and connections of the magnets may all be changed by those skilled in this art without departing from the spirit of my invention as set forth in the following claims.

I claim:—

1. In an electric machine, the combination of a housing and a shaft mounted therein, motor and generator armatures on the shaft, means for conducting direct current to the motor armature, a commutator and means for conducting current from the motor armature magnets to the commutator and from the commutator to the motor field magnets, a set of generator field magnets adjacent the motor field magnets, and wires connecting the motor field magnets to the generator field magnets so that the same current which energizes the motor field magnets will energize the generator field magnets.

2. In an electric machine, the combination of a motor and a generator, each provided with an armature, radial field magnets for the generator and for the motor, a stationary commutator, a brush running thereon to convey direct current thereto, wires leading from the commutator bars to the motor field magnets, said magnets being so wound that their inner ends are all of the same polarity, a series of radial field magnets for the generator, and wires leading from the motor field magnets to the generator field magnets, said generator field magnets being so wound that the inner ends of adjacent magnets shall have opposite polarity.

3. In an electric machine, the combination of a cylindrical housing, a series of radially extending field magnets mounted within the housing, a shaft, an armature thereon, embodying a series of radially extending magnets, means to conduct a continuous current to the armature magnets so that all the outer ends thereof will always be of the same polarity, means to interruptedly conduct current to the field magnets so that their outer ends will have the opposite polarity to the adjacent ends of the armature magnets, and means to control the current to the field magnets.

4. In an electric machine, the combination of a cylindrical housing, a series of radially extending field magnets mounted within the housing, a shaft, an armature thereon, embodying a series of radially extending magnets, means to conduct a continuous current to the armature magnets so that all the outer ends thereof will always be of the same polarity, means to interruptedly conduct current to the field magnets so that their outer ends will have the opposite polarity to the adjacent ends of the armature magnets, means to control the current to the field magnets comprising a commutator having conductor bars, and conductors connecting adjacent commutator bars to adjacent field magnets.

5. In an electric machine, the combination of a cylindrical housing, a series of radially extending field magnets mounted within the housing, a shaft, an armature thereon, embodying a series of radially extending magnets, means to conduct a continuous current to the armature magnets so that all the outer ends thereof will always be of the same polarity, means to interruptedly conduct current to the field magnets so that their outer ends will have the opposite polarity to the adjacent ends of the armature magnets, and means to control the current to the field magnets, said field magnets being divided into groups of which the individual magnets are energized in rotation.

6. In an electric machine, the combination of a cylindrical housing, a series of radially extending field magnets mounted within the housing, a shaft, an armature thereon, embodying a series of radially extending magnets, means to conduct a continuous current to the armature magnets so that all the outer ends thereof will always be of the same polarity, means to interruptedly conduct current to the field magnets so that their outer ends will have the opposite polarity to the adjacent ends of the armature magnets, and means to control the current to the field magnets, the armature magnets being connected in parallel and the field magnets being divided into groups of which individual magnets are energized in rotation, the several energized field magnets being in series with the combined armature magnets.

7. In an electric machine, the combination of a cylindrical housing, a shaft rotatable therein, two armatures on the shaft, a series of evenly spaced radial magnets in one plane on each armature, a series of radially extending field magnets mounted within the housing for each series of armature magnets and in the same plane, electric conductors connecting to the several magnets, the field magnets and the magnets of one armature all connecting to the same source of current supply, and separate conductors connecting to the magnets of the other armature, the numbers of field and armature magnets in one plane being the same while those of the other plane are uneven.

8. In an electric machine, the combination of a cylindrical housing, a shaft mounted therein, motor and generator armatures on the shaft, a series of radial magnets on each armature conductor for the current connecting to the magnets of the motor armature, a housing, field magnets radially mounted therein in alinement with the magnets of the armatures, wires connecting said field magnets to the magnets of the motor armature, and conductor wires connecting to the magnets of the generator armature.

AMEL B. BROLUSKA.